United States Patent [19]

Kitagawa

[11] Patent Number: 4,964,012
[45] Date of Patent: Oct. 16, 1990

[54] ELECTRIC NOISE ABSORBER

[75] Inventor: Hiroji Kitagawa, Nagoya, Japan

[73] Assignee: Kitagawa Industries Co., Ltd., Aichi, Japan

[21] Appl. No.: 404,623

[22] Filed: Sep. 8, 1989

[30] Foreign Application Priority Data

Sep. 24, 1988 [JP] Japan .................... 63-125019[U]

[51] Int. Cl.⁵ .................................... H01F 17/06
[52] U.S. Cl. .................... 361/113; 333/81 A; 333/81 R; 307/89; 307/91; 307/105; 336/212; 336/DIG. 8
[58] Field of Search .................. 361/1, 112, 117; 333/12, 81 R, 81 A; 307/89, 91, 104, 105; 336/212, DIG. 8

[56] References Cited

U.S. PATENT DOCUMENTS 4,825,185 4/1989 Matsui .................... 336/212 X

FOREIGN PATENT DOCUMENTS 257179   3/1988  European Pat. Off. .
2201554  9/1988  United Kingdom .
2201840  9/1988  United Kingdom .
2205199 11/1988  United Kingdom .
2207007  1/1989  United Kingdom .

Primary Examiner—Derek S. Jennings
Attorney, Agent, or Firm—Oliff & Berridge

[57] ABSTRACT

An electric noise absorber, comprising divided magnetic substances made of ferrite, a holding member for holding the magnetic substances at its holding projections, and engaging members formed in the magnetic substances which engage with the holding projections. The electric noise absorber is attached to and detached from an electric cable easily without removing the electric cable and is composed of a minimum number of units.

20 Claims, 5 Drawing Sheets

ELECTRIC NOISE ABSORBER

BACKGROUND OF THE INVENTION

This invention relates to an electric noise absorber for absorbing electric noise that is generated within an electronic device or that enters the device from the outside through an electric cable.

As a method for absorbing such noise, it is well-known that surrounding an electric cable with a magnetic substance, such as ferrite, reduces electric noise on the electric cable. For example, in Japan published unexamined utility model application No. 63-39997, two pieces of half ring-shaped ferrite are accommodated in a case, through which an electric cable passes. In another conventional electric noise absorber, two pieces of half ring-shaped ferrite are fixed to an electric cable with adhesive tape. In the related art devices, the electric noise absorbers can be attached to and detached from electric cables without removing installed cables because the ferrite is divided in two, and these absorbers can be moved to the most effective position to reduce electric noise.

However, these related art electric noise absorbers are large and their installation operations are very tedious.

Fixing ferrite to an electric cable with adhesive tape is inconvenient because installing operations are complicated and the adhesive tape must be removed from and attached to cables again whenever the position of the fixed ferrite needs to be changed.

When two pieces of ferrite are accommodated in a case, an electric cable can be easily fixed between the two pieces of ferrite. However, because the case must contain the ferrite pieces and have elastic units for securing the surfaces of the two ferrite pieces together, the case must be large and its shape complicated.

SUMMARY OF THE INVENTION

It is an object of this utility model to provide a small electric noise absorber which can be easily attached to and detached from electric cable.

This object is realized by an electric noise absorber of of the invention which includes: two magnetic substances divided in the longitudinal direction which are shaped so as to surround the periphery of electric cable and absorb electric noise in an electric cable of an electronic device, a holding member which is made of elastic material which holds and presses the divided magnetic substances at its holding projections, and engaging members which are formed in the magnetic substances and engage with the holding projections.

BRIEF DESCRIPTION OF THE DRAWINGS

This invention is illustrated diagrammatically in the following drawings wherein.

DETAILED DESCRIPTION OF PREFERRED EMBODIMENTS

Set forth is an explanation of embodiments of the present invention with reference to the attached drawings FIG. 1 through FIG. 11.

Figure 1:
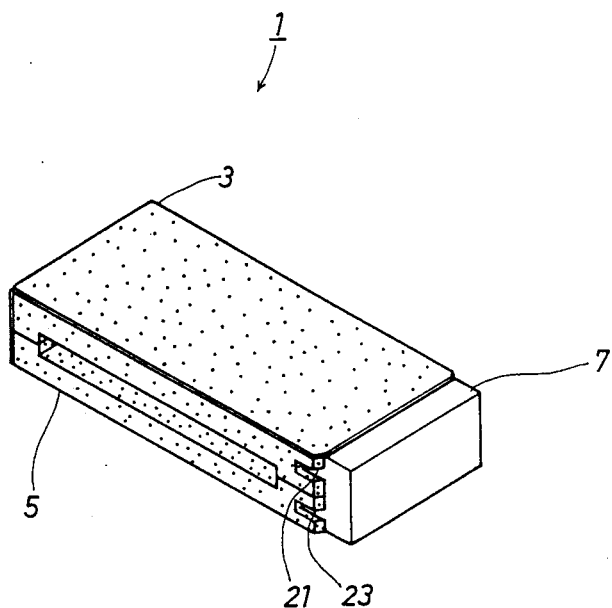
FIG. 1 is a perspective view of an electric noise absorber of the first embodiment of the present invention.

As shown in FIG. 1, a perspective view of the first embodiment, an electric noise absorber 1 comprises a first magnetic substance 3, a second magnetic substance 5, both of which are made of ferrite and surround an electric cable of an electronic device, and a holding member 7, which holds the two magnetic substances 3 and 5.

Figure 2:
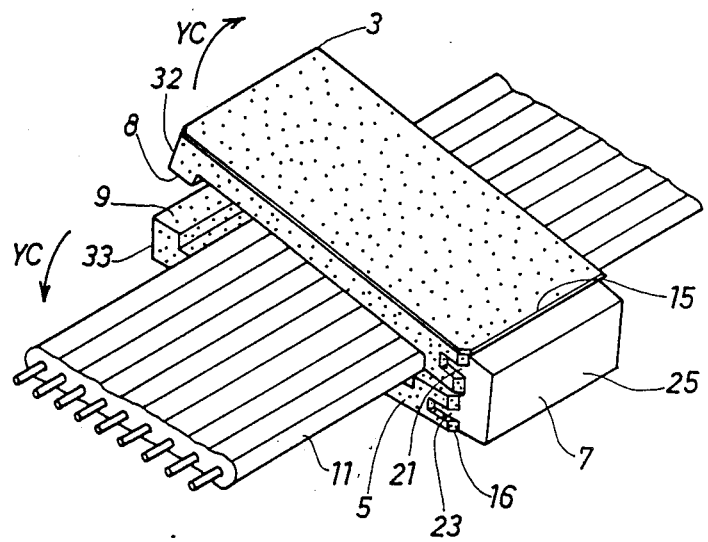
FIG. 2 is a perspective view of an electric noise absorber of the first embodiment of the present invention.
Figure 3:
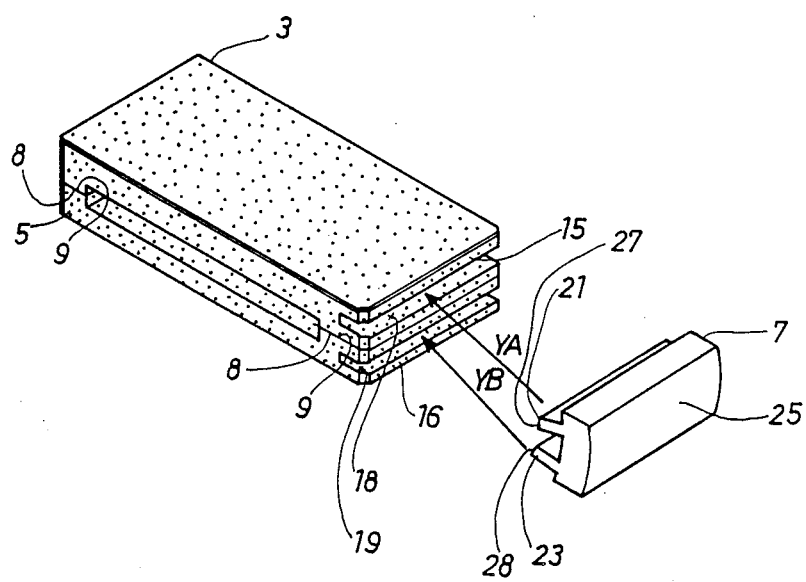
FIG. 3 is a perspective view of an electric noise absorber of the first embodiment of the present invention.

As shown in FIGS. 2 and 3, which are also perspective views, the first magnetic substance 3 and the second magnetic substance 5 are shaped so as to surround the periphery of a flat cable 11 when a contact plane 8 of the first magnetic substance 3 and another contact plane 9 of the second magnetic substance 5 are closed. Thus, a strong magnetic circuit of ferrite is formed around the flat cable 11. After it is sintered, a magnetic substance can be divided with a diamond cutter into two magnetic substances 3 and 5. Their respective contact planes 8 and 9 are then polished. Alternatively, the magnetic substances 3 and 5 can be molded together in a press die with a V-shaped groove, sintered, and broken into two pieces, instead of using a diamond cutter.

An end 15 of the first magnetic substances 3 and an end 16 of the second magnetic substances 5 have groove-like engaging members 18 and 19 respectively, both of which engage with the holding member 7.

Figure 4:
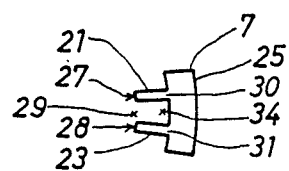
FIG. 4 is a front view of a holding member of the first embodiment.

The holding member 7, whose perspective view is shown in FIGS. 2 and 3 and front view in FIG. 4, is made of elastic plastic. However, any elastic material, such as metal, can be used as the holding member 7. The holding member 7 has a first holding projection 21 engaging with the engaging member 18 of the first magnetic substance 3, a second holding projection 23 engaging with the engaging member 19 of the second magnetic substance 5, and a tabular energization member 25. The two projections 21 and 23 perpendicularly project from the tabular energization member 25. The energization member 25 has, as shown in FIG. 4, an arched shape. Distance 29 between tip 27 of the first holding projection 21 and tip 28 of the second holding projection 23 is shorter than distance 34 between root 30 of the first holding projection 21 and root 31 of the second holding projection 23.

The two magnetic substances 3 and 5 engage with the holding member 7 and surround the flat cable 11 as follows.

As shown in FIG. 3, the tip 27 of the first projection 21 of the holding member 7 is pushed up and moved in the direction indicated by an arrow YA, and the tip 28 of the second projection 23 is pushed down and moved in the direction indicated by an arrow YB. When the holding projections 21 and 23 are inserted completely into the engaging members 18 and 19, as shown in FIG. 1, the holding projections 21 and 23 become parallel to each other and the energization member 25 is deformed such that it is no longer arched. When the energization member 25 is thus deformed, it tends to spring back to its original shape because of its elastic properties.

Therefore, the holding projections 21 and 23, which are inserted into the engaging members 18 and 19, force the two magnetic substances 3 and 5 together such that contact planes 8 and 9 contact each other.

As shown in FIG. 2, two ends 32 and 33 are sufficiently opened in the direction indicated by arrows YC to allow the flat cable 11 to pass between the contact planes 8 and 9. The flat cable is put between the magnetic substances 3 and 5. The contact planes 8 and 9 are then closed, thus forming a magnetic circuit of ferrite around the flat cable 11.

As mentioned above, the electric noise absorber of the present embodiment can absorb electric noise from the flat cable 11, which is inserted through the contact planes 8 and 9 of the magnetic substances 3 and 5. When the two contact planes 8 and 9 are opened, this electric noise absorber can be moved to the most effective place for absorbing electric noise. Furthermore, this electric noise absorber can be composed of very small units such as the holding member 7, which holds the first magnetic substance 3 and the second magnetic substance 5 at their respective engaging members 18 and 19. Thus, this electric noise absorber is superior in that it is easy to operate and is very small.

Regarding the magnetic substance, either hard or soft ferrite can be used. Further, plastic magnet or synthetic rubber magnet or the like, which is made by mixing magnetic ferrite powder with plastic or rubber or the like, can also be used. In addition, adhesive material can be spread on the holding projections 21 and 23 so that the holding member 7 more securely engages with the magnetic substances 3 and 5.

Figure 5:
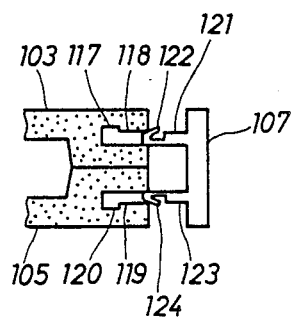
FIG. 5 is a partial front view of the second embodiment.

The second embodiment of the present utility model is shown in FIG. 5, where the engaging members 18 and 19 and the first and second holding projections 21 and 23 in the first embodiment are slightly changed in shape. In this second embodiment, groove-like indentations 117 and 120 are formed at the bottoms of engaging members 118 and 119 respectively, and hooks 122 and 124 are formed at the respective tips of first holding projection 121 and second holding projection 123. Hook 122 engages with indentation 117 and hook 124 engages with indentation 120 so that a holding member 107 with two holding projections strongly secures a first magnetic substance 103 and a second magnetic substance 105.

Figure 6:
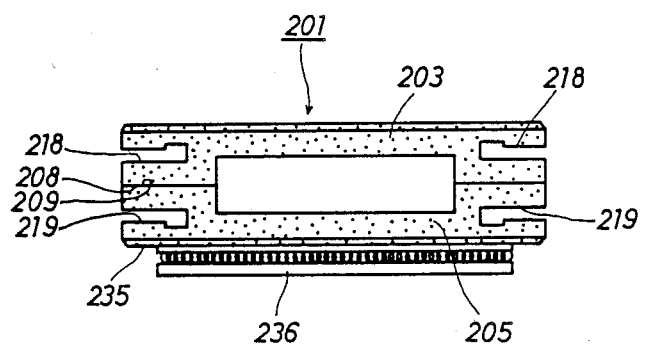
FIG. 6 is a front view of the third embodiment.

Set forth below is an electric noise absorber 201 of the third embodiment. As shown in FIG. 6, two engaging members 218 and 219, which are shown in FIG. 5, are formed at both sides of a first magnetic substance 203 and a second magnetic substance 205, and a surface fastener 236 is attached on an under surface 235 on the second magnetic substance 205. The first magnetic substance 203 and the second magnetic substance 205 are fixed by one holding member, which is the same as the holding member 7 in the second embodiment at either side, or by two such holding members, one on each side. An electric noise absorber of the third embodiment can be attached to a unit of an electronic device by means of the surface fastener 236. Consequently, the electric noise absorber of the third embodiment can be operated more easily and securely, and the contact surfaces 208 and 209 can be pressed by the two strong holding members.

Figure 7:
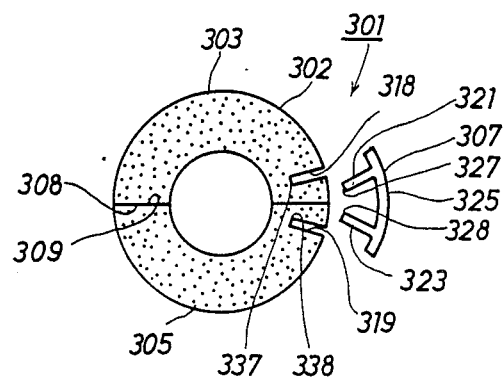
FIG. 7 is a front view of the fourth embodiment.

An electric noise absorber 301 of the fourth embodiment shown in FIG. 7 has cylindrical divided-in-two magnetic substance 302 and is held by an elastic holding member 307. A first magnetic substance 303 and a second magnetic substance 305 have groove-like engaging members 318 and 319, respectively, which are perpendicular to the surface of the magnetic substances 303 and 305. A holding member 307 has a first holding projection 321, a second holding projection 323 and an arch-shaped tabular energization member 325. The distance between the tip 327 of the first holding projection 321 and the tip 328 of the second holding projection 323 is narrower than the distance between the bottom 337 of engaging member 318 and the bottom 338 of engaging member 319. When the holding member 307 engages with the two magnetic members 303 and 305, two contact planes 308 and 309 are closed.

In order to install electric noise absorber 301 around an electric cable, two contact planes 308 and 309 are opened, the electric cable is inserted between magnetic substances 303 and 305, which are joined by holding member 307, and the contact planes 307 and 309 are closed again. Thus, the magnetic circuit of the divided-in-two magnetic substance is formed around the electric cable.

Figure 8:
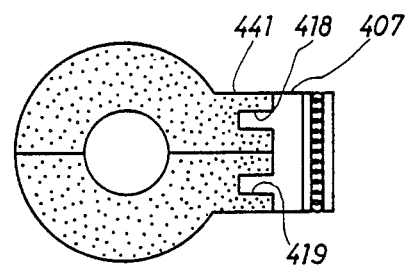
FIG. 8 is a front view of the fifth embodiment.
Figure 9:
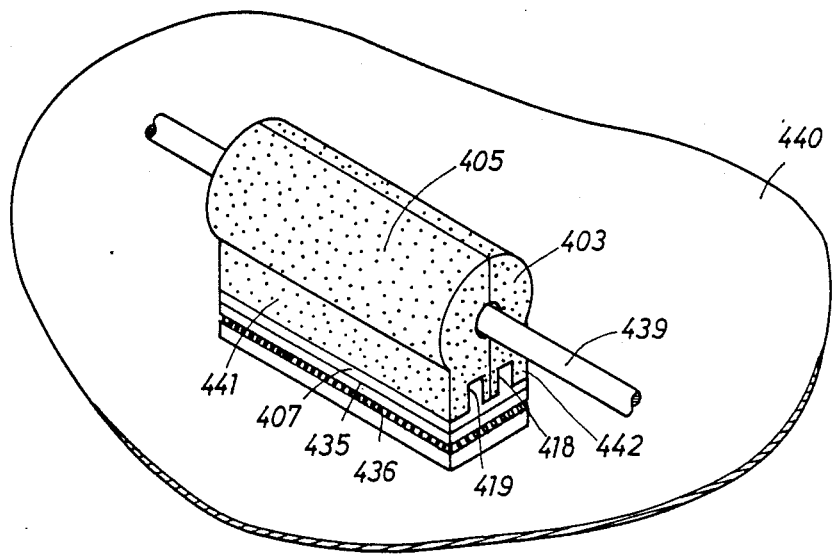
FIG. 9 is a perspective view of the fifth embodiment.

FIG. 8 is a front view of the fifth embodiment, where an electric noise absorber 301 shown in FIG. 7 is depicted. As shown in FIG. 9, magnetic substances 403 and 405 are provided with bases 442 and 441, respectively, to which engaging members 418 and 419 are attached. A holding member 407 holds the first magnetic substance 403 and the second magnetic member 405 at engaging members 418 and 419. A surface fastener 436 is attached to an under surface 436 of the holding member 407.

As mentioned above, this electric noise absorber of the fifth embodiment shown in FIGS. 8 and 9 can reduce electric noise from a cable 439 through the first magnetic member 403 and the second magnetic member 405 and can be attached to a component 440 of an electronic device.

Figure 10:
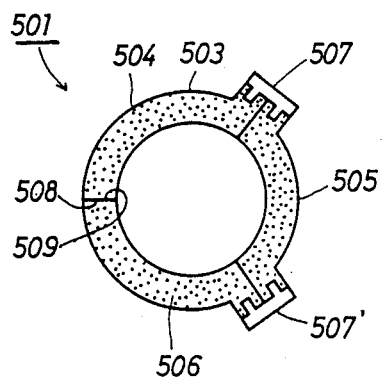
FIG. 10 is a front view of the sixth embodiment.

The following is the sixth embodiment. An electric noise absorber 501 in FIG. 10 has a structure similar to the electric noise absorber in FIG. 8. In FIG. 10, two holding members 507 and 507' hold a divided-in-three magnetic substance 504. The divided-in-three magnetic substance 504 comprises a first magnetic substance 503, a second magnetic substance 505, and a third magnetic substance 506. A holding member 507 holds the first magnetic substance 503 and the second magnetic substance 505, and another holding member 507' holds the second magnetic substance 505 and the third magnetic substance 506. In this embodiment, the holding members 507 and 507' are each deformed only slightly when the two contact surfaces 508 and 509 are opened widely. Therefore, the durability of the two holding members 507 and 507' is increased.

Figure 11:
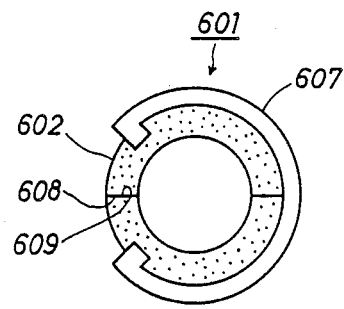
FIG. 11 is a front view of the seventh embodiment.

FIG. 11 is a front view showing an electric noise absorber 601 of the seventh embodiment. This electric noise absorber 601 is similar to the electric noise absorber 301 of the fourth embodiment. A cylindrical divided-in-two magnetic substance 602 is held by an elastic holding member 607, which covers nearly three-fourths of the magnetic substance 602 and presses the magnetic substance 602 so that two contact surfaces 608 and 609 are not separated.

It should be understood that this invention is not limited to the embodiment illustrated and described, but that in its broadest aspects it includes all equivalent embodiments and modifications that come within the scope of the claims.

What is claimed is:

1. An electric noise absorber for absorbing noise on an electric cord comprising:
    first and second bodies of magnetic substances, which contact each other along a joint formed by juxtaposed mating surfaces such that the bodies at least partially surround the cord;
    each body having an engaging indentation disposed on opposite sides of the joint;
    an elastic holding member having first and second holding projections, wherein the first holding projection engages the engaging indentation on the first body and the second holding projection engages the engaging indentation on the second body such that the elastic holding member holds the two bodies together at the joint to surround the electric cord.

2. The electric noise absorber of claim 1, wherein the indentations on the surface of the bodies are grooves.

3. The electric noise absorber of claim 2, wherein:
    locking indentations are formed at the bottom of the grooves; and
    each holding projection has a locking projection for extending into the locking indentations.

4. The electric noise absorber of claim 1, wherein the elastic holding member further comprises an arch-shaped energization member, the first and second holding projections extend from the energization member, and the shape of the energization member is deformed when the first and second holding projections engage the engaging indentations thereby causing the energization member to force the two bodies together around the cord.

5. The electric noise absorber of claim 1, wherein:
    each body has a second engaging indentation; and
    a second elastic holding member has a first holding projection for engaging the second engaging indentation on the body and a second holding projection for engaging the second engaging indentation of the second body.

6. The electric noise absorber of claim 1, wherein surface fastening means for fastening the electric noise absorber to a mounting surface are attached to the outer surface of one of the magnetic substances.

7. The electric noise absorber of claim 1, wherein the bodies are made of ferrite.

8. The electric noise absorber of claim 1, wherein the bodies are formed by longitudinally dividing a tube-shaped magnetic substance into two.

9. The electric noise absorber of claim 1, wherein a base is formed on the bodies and the engaging indentations are located on the bases.

10. The electric noise absorber of claim 1, wherein fastening means for fastening the electric noise absorber to a mounting surface are attached to the elastic holding member.

11. The electric noise absorber of claim 1, wherein a magnetic circuit is formed around the cord by the bodies.

12. The electric noise absorber of claim 8, wherein the elastic holding member covers a majority of the surface area of the magnetic substances.

13. The electric noise absorber of claim 1, wherein the elastic holding member is made of elastic plastic.

14. The electric noise absorber of claim 1, wherein the elastic holding member is made of metal.

15. The electric noise absorber of claim 1, wherein the bodies are synthetic rubber magnets.

16. An electric noise absorber for absorbing noise on an electric cord comprising:
    first, second, and third bodies of magnetic substance, wherein the first body contacts the second body forming a first joint, the first body contacts the third body forming a second joint, and the second body contacts the third body forming a third joint such that the bodies surround the cord;
    a plurality of engaging indentations, one formed on the first body near the first joint, one formed on the first body near the second joint, and one formed on the third body near the second joint;
    first and second elastic holding members, each having two engaging projections, wherein the engaging members of the first elastic member attach to the engaging indentations of the first and second bodies near the first joint and the engaging members of the second elastic holding member engage the indentations on the first and third bodies near the second joint such taht the first and second elastic holding members hold the magnetic substances in place around the cord.

17. An elastic noise absorber for absorbing noise on an electric cable comprising:
    two bodies of magnetic substance having contacting inner surfaces, with a recess formed in the inner surface of at least one of the bodies such that the bodies surround the electric cable;
    a joining surface between the two bodies;
    engaging means formed on each body on opposite sides of said joining surface;
    an elastic holding member that engages the engaging means, thereby pressing the bodies together at the joining surface.

18. The electric noise absorber of claim 17, wherein:
    the engaging members are projections having grooves and are located on adjacent ends of the two magnetic substances; and
    the elastic holding members have engaging projections that engage the grooves in the engaging members.

19. The electric noise absorber of claim 18, wherein the elastic holding member comprises an arch-shaped energization member to which the engaging members are attached, and the and the arch-shaped energization member is deformed when the engaging projections engage the engaging members such that the energization member presses the bodies together.

20. The electric noise absorber of claim 19, wherein:
    an indentation is formed in the grooves on the engaging members; and
    the engaging members have elastic locking hooks that project into the indentations.

* * * * *